June 13, 1950     H. M. BRAMBERRY, SR     2,511,458
OIL CONTROL PISTON

Filed March 25, 1947     2 Sheets-Sheet 1

Inventor
HARRY M. BRAMBERRY

By Scrivener & Parker
Attorneys

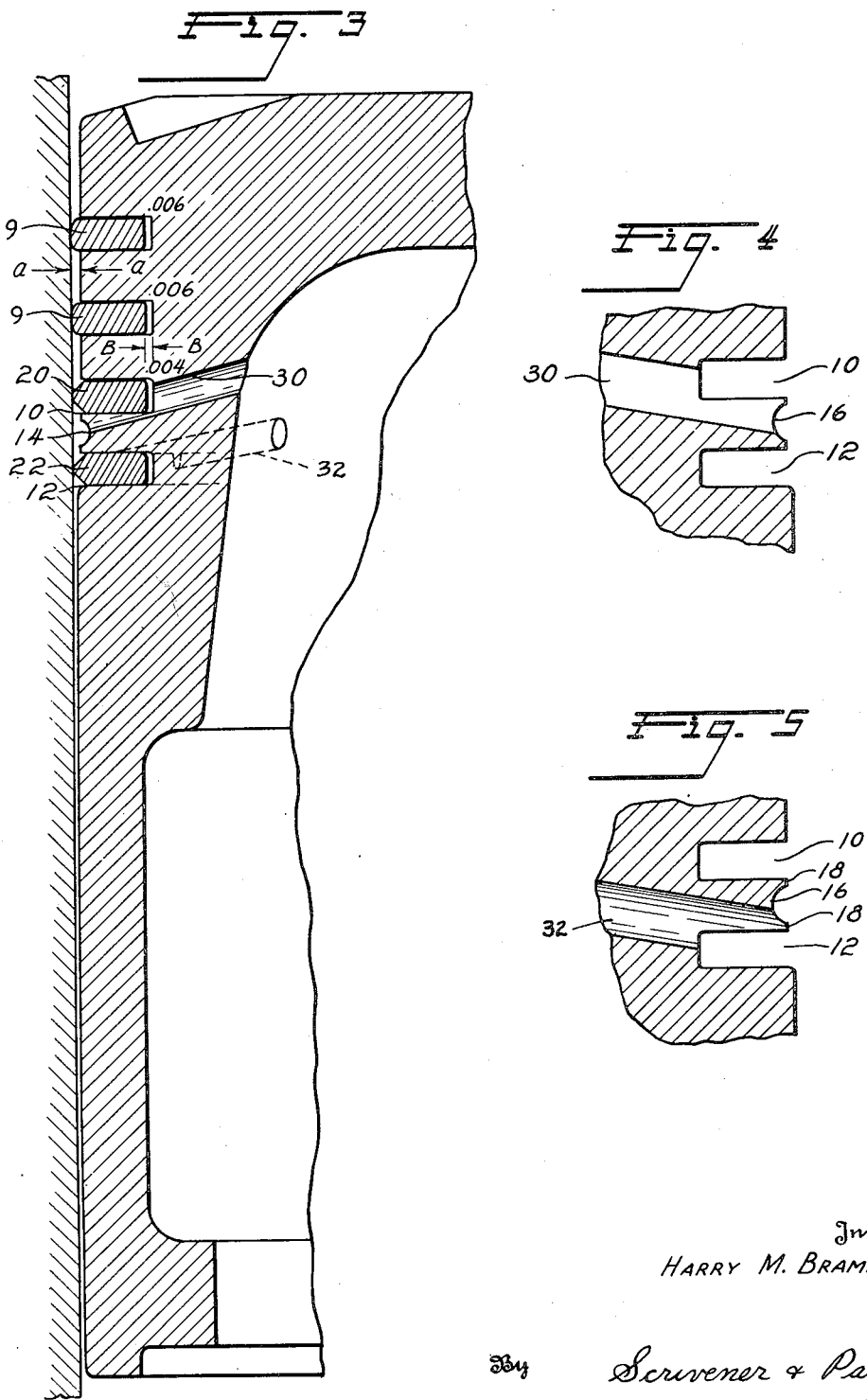

Patented June 13, 1950

2,511,458

UNITED STATES PATENT OFFICE 2,511,458

OIL CONTROL PISTON

Harry M. Bramberry, Sr., New Castle, Ind.

Application March 25, 1947, Serial No. 736,997

3 Claims. (Cl. 309—8)

This invention relates, in general, to reciprocating pistons for internal combustion engines and the like and, more particularly, to means for controlling and disposing of the oil which lubricates the wall of the cylinder within which the piston moves.

Pistons of the type to which the invention relates comprise a hollow, cylindrical body provided with at least two adjacent oil control ring grooves separated by a land and may also be provided with one or more compression ring grooves. The oil-control rings scrape the excess oil from the surface of the cylinder during the reciprocation of the piston and, in order to dispose of this oil, it has heretofore been proposed to provide a plurality of radial openings through the wall of the piston, each of which communicates the hollow interior thereof with the space between the oil-control rings.

It has been the principal object of the present invention to provide a piston with oil-control ring grooves and oil-relief holes of the described type but in which the positioning and disposition of the oil-relief holes, and their number and relation to the ring grooves and the land therebetween are such that new and greatly improved results are provided. In this connection, it is an object of the invention to provide oil-relief holes which are so disposed with respect to the direction of movement of the piston that advantage is taken of the greater inertia forces existing during the upward, or outward, movement of the piston to produce improved scavenging of the ring grooves and the space between the rings, and whereby also the oil is effectively drained from the upper inner corners of the ring grooves where it tends to accumulate during operation. A further object of the invention has been to provide means for ventilating the spaces behind the oil-control rings and the spaces between these rings in such a way that objectionable blow-by noise is eliminated.

Other objects and features of novelty of the invention will be made apparent by the following specification and the annexed drawings, it being understood, however, that such specification and drawings are only illustrative of the invention and impose no limitation thereon not imposed by the appended claims.

Referring to the drawings, in which similar reference numerals refer to like parts:

Fig. 3 is an enlarged sectional view of part of the piston of Fig. 2, with the addition of piston rings thereto;

Fig. 4 is an enlarged sectional view of part of the side wall of Fig. 2, showing an oil-relief hole for the upper oil-control ring groove, and Fig. 5 is a view similar to Fig. 4 but showing an oil-relief hole for the lower oil-control ring groove.

Figure 1:
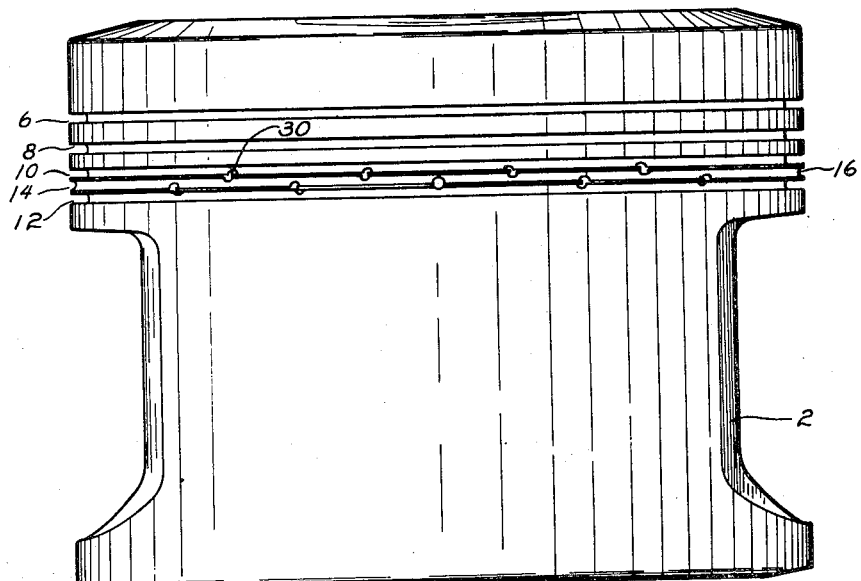
Fig. 1 is a side elevational view of a piston formed according to this invention.
Figure 2:
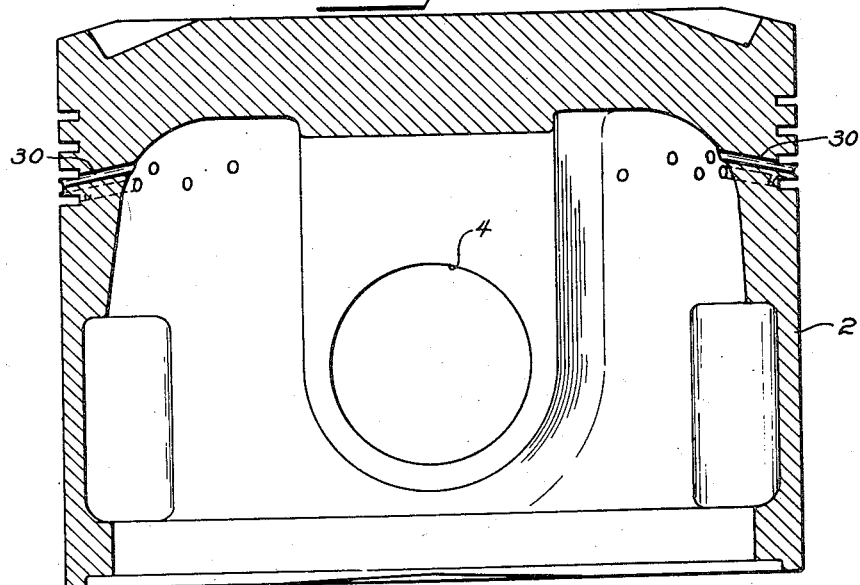
Fig. 2 is a sectional view through the axis of a piston formed according to this invention.

In carrying my invention into effect, I communicate each oil-control ring groove to the hollow interior of the piston by one or more openings through the wall of the piston, each of which openings intersects a single oil-control ring groove and also the exterior face of the land between that groove and the adjacent oil-control ring groove. In the usual piston to which my invention will be applied, there are at least two adjacent oil-control ring grooves and in applying my invention to a piston of such structure there will be provided a first series of openings through the wall of the piston, each of which openings will intersect one of these grooves and also the land between the two grooves, and a second series of openings each of which will intersect the second groove and the land between the two grooves, whereby each opening will communicate one of the grooves and the space between the oil-control rings to the hollow interior of the piston and thence to the crank case. Preferably, the openings of these two groups are alternately arranged in a series extending about the piston as shown in Figs. 1 and 2. Each of these openings is inclined toward the head of the piston whereby advantage is taken of the greater inertia forces existing during the outward movement of the piston. These forces act on the lubricating oil of the engine as well as on the moving piston and the parts connected to it, and by inclining the oil-relief openings in the described manner I secure improved scavenging of the oil-control ring grooves and the space between these rings. This improved drainage and scavenging principle reduces carbon and sludge accumulation in the oil ring grooves to a degree not heretofore attained. It will be seen that the space behind each ring and the space between the adjacent oil-control rings are ventilated through the same openings.

An embodiment of my invention is disclosed in the drawings as applied to a piston of a type developed by me and having oil-control ring grooves and compression ring grooves, all of which are disposed in the external wall of the piston above the piston pin, and all of which are of such size and are so constructed as to accommodate piston rings of the sizes, proportions and materials described and claimed in my United States Letters Patent No. 2,404,616. This piston comprises the skirt 2 surrounding a hollow interior and having bearings 4 for the piston pin. Two spaced compression ring grooves 6, 8 are provided in the upper part of the side wall of the piston to accommodate compression rings 8. Below these are formed two spaced oil-control ring grooves 10, 12. The oil-control ring grooves are separated by an annular land portion 14 having an arcuate groove 16 in the outer face thereof which is bounded on each side by a flat surface 18 which forms part of the external cylindrical surface of the piston and, in normal operation of the piston, is spaced radially inwardly from the internal cylindrical wall of the cylinder. The outer faces of the oil-control rings 20, 22 are normally in sliding contact with the cylinder wall and a chamber is therefore formed between the upper and lower oil-control rings, the cylinder wall and the external wall of the land 14, within which is collected the excess oil which the oil-control rings scrape from the cylinder walls during the movement of the piston.

Means are provided by the invention for separately draining oil from each oil-control ring groove and from the chamber between the oil-control rings. Such means comprise two groups of passages extending through the wall of the piston. Each of the passages 30 of the first of these groups communicates the hollow interior of the piston to the upper oil-control ring groove 10 and to the upper part of the land 14, as clearly shown in Figs. 3 and 4. The upper wall of each passage 30 intersects the upper groove 10 just below the inner upper corner of the groove 10, while the lower wall of each passage 30 intersects the land 14 at approximately the midpoint of the arcuate groove therein. Each of the passages 32 of the second of these groups communicates the hollow interior of the piston to the lower oil-control ring groove 12 and to the lower part of the land 14, as also shown in Figs 3 and 5. The lower wall of each passage 32 intersects the lower groove 12 below the upper inner corner thereof while the upper wall of each passage 32 intersects the land 14 at approximately the midpoint of the arcuate groove therein. Each group may include one or a purality of passages and, in a preferred embodiment of the invention, each group includes a number of passages and those of the two groups are so arranged that adjacent passages are of opposite groups.

Means are provided by the invention for so arranging and disposing the oil-relief openings 30, 32 that full advantage is taken of the energy of the moving piston to facilitate the removal of oil from the chamber between the oil-control rings and from the spaces behind these rings. Such means comprise, in accordance with the invention, the inclination of the oil-relief openings toward the outer end of the piston. Thus, these openings preferably lie in a plane including the axis of the piston, which is of course parallel to the direction of movement of the piston, and have their inner ends closer to the outer end of the piston than their outer ends. It is well known that the kinetic energy of a reciprocating piston is greatest during its outward movement and this is utilized to greatest advantage by the described inclination of the openings 30, 32 to facilitate the removal of oil through these openings into the interior of the piston and the crank-case.

It will be seen that by reason of the improved ventilation provided by the common communication of each oil-control ring groove and the chamber between the oil-control rings to the interior of the piston the pressure within the spaces behind and between the oil-control rings will be constantly equalized at any pressure which may result from leakage past the compression rings, thus eliminating objectionable blow-by noise.

It has been found that for optimum performance there is a limitation to the spacing of the two oil-control ring grooves. Obviously this dimension controls the width of the land between the grooves as well as the oil ring width. A value of 0.100 inch has been found to be most satisfactory for the land width, permitting not only oil-relief openings of adequate size, but also effecting an optimum spacing of the oil-control rings, using oil rings of 0.070 inch width. If this dimension is appreciably increased, the efficiency of the structure will decrease. By maintaining this dimension oil-control becomes a simple problem of varying the unit pressure of the oil ring units, since it has been proved that oil-control in internal combustion engines is a problem of removing the excess film from the cylinder wall surface.

While I have described and illustrated but one embodiment of the invention, it will be apparent to those skilled in the art that other embodiments, as well as modifications of that disclosed, may be made without departing in any way from the spirit or scope of the invention, for the limits of which reference must be had to the appended claims.

What is claimed is:

1. A hollow piston having at least two adjacent oil-control ring grooves separated by a land and having at least two oil-relief openings therein, each of said openings extending through the wall of the piston and intersecting only one of said ring grooves and the external face of said land and opening into the hollow interior of the piston whereby each oil-control ring groove is separatly communicated with the space between the oil-control rings and the hollow interior of the piston.

2. A hollow piston according to claim 1, in which a part of the periphery of each oil-relief opening intersects the bottom wall of one oil-control ring groove.

3. A hollow piston having upper and lower oil-control ring grooves separated by a land, the upper groove communicating with the interior of the piston through an oil relief passage opening into the face of the land and the lower side and bottom of the groove, and the lower groove communicating with the interior of the piston through a second oil relief passage separate from the first and opening into the face of the land and the upper side and bottom of the groove.

HARRY M. BRAMBERRY, Sr.

REFERENCES CITED

The following references are of record in the file of this patent:

UNITED STATES PATENTS

| Number | Name | Date |
|---|---|---|
| 1,030,213 | Tremolieres | June 18, 1912 |
| 1,240,421 | Coatalen | Sept. 18, 1917 |
| 1,505,749 | Teetor | Aug. 19, 1924 |
| 1,981,993 | Daisley | Nov. 27, 1934 |
| 2,110,316 | Alexandrescu | Mar. 8, 1938 |